(12) United States Patent
Salisbury (10) Patent No.: US 8,720,757 B2
(45) Date of Patent: May 13, 2014

(54) LOW-PROFILE STORAGE APPARATUS FOR A MOTORCYCLE (75) Inventor: Rick Salisbury, Springville, UT (US)

(73) Assignee: STP Industries, LLC, Provo, UT (US)

( * ) Notice: Subject to any disclaimer, the term of this patent is extended or adjusted under 35 U.S.C. 154(b) by 152 days.

(21) Appl. No.: 13/191,344

(22) Filed: Jul. 26, 2011

(65) Prior Publication Data

US 2012/0187167 A1 Jul. 26, 2012

Related U.S. Application Data (60) Provisional application No. 61/368,520, filed on Jul. 28, 2010.

(51) Int. Cl.
B62J 9/00 (2006.01)

(52) U.S. Cl.
USPC .......................... 224/413; 224/423

(58) Field of Classification Search
USPC ......... 224/413, 419, 408, 412, 407, 428, 430, 224/431, 434, 435, 452, 546, 423, 427, 224/414; 296/78.1, 37.1; 280/202, 204, 280/288.4, 292
See application file for complete search history.

(56) References Cited

U.S. PATENT DOCUMENTS

| 3,362,596 | A | * | 1/1968 | Bostwick | 224/417 |
|---|---|---|---|---|---|
| 3,963,158 | A | | 6/1976 | Clenet | |
| 4,003,508 | A | | 1/1977 | Hoops | |
| D244,927 | S | | 7/1977 | Ahnthon, III | |
| 4,163,513 | A | * | 8/1979 | Kramer | 224/413 |
| 4,195,757 | A | * | 4/1980 | Jefferson | 224/414 |
| 4,266,703 | A | | 5/1981 | Litz | |
| 4,269,335 | A | | 5/1981 | LaRose et al. | |
| 4,303,184 | A | | 12/1981 | Kloth | |
| 4,447,088 | A | | 5/1984 | Bodlovic | |
| 4,466,660 | A | | 8/1984 | Mabie | |
| 4,469,256 | A | | 9/1984 | McEwen | |
| D276,712 | S | | 12/1984 | Kashio et al. | |
| 4,501,384 | A | | 2/1985 | Itoh | |
| 4,588,114 | A | | 5/1986 | Lebaron et al. | |

(Continued)

FOREIGN PATENT DOCUMENTS

| EP | 1431167 | 6/2004 |
|---|---|---|
| JP | 11-217094 | 8/1999 |

(Continued)

OTHER PUBLICATIONS

Easy Rail: The Solution is Easy; Rollon; pp. D3-D14; Cat. 41-41E; the inventor believes that this was available previous to the filing of this application.

(Continued)

Primary Examiner — Justin Larson
Assistant Examiner — Phillip Schmidt
(74) Attorney, Agent, or Firm — Thorpe North & Western LLP (57) ABSTRACT Disclosed is a low-profile storage apparatus for a motorcycle. The low-profile storage apparatus comprises a base attachable to a motorcycle. The low-profile storage apparatus also comprises a shell supported about the base, and movable between a stowing position and an open position. The low-profile storage apparatus further comprises at least one storage compartment supported by an underside of the shell, the at least one storage compartment having an opening accessible upon the shell being positioned in the open position.

16 Claims, 8 Drawing Sheets (56) References Cited

U.S. PATENT DOCUMENTS

| | | | |
|---|---|---|---|
| D287,237 S | 12/1986 | Abe | |
| 4,690,237 A | 9/1987 | Funabashi et al. | |
| 4,726,203 A | 2/1988 | Komuro | |
| 4,773,573 A | 9/1988 | Doveri | |
| 4,809,891 A * | 3/1989 | Patrin | 224/527 |
| 4,907,428 A | 3/1990 | Nakashima et al. | |
| 4,993,731 A | 2/1991 | Fuller | |
| 5,025,883 A | 6/1991 | Morinaka et al. | |
| 5,518,291 A | 5/1996 | Shaide | |
| 5,558,260 A | 9/1996 | Reichert | |
| 5,664,715 A | 9/1997 | Gogan et al. | |
| 5,667,232 A | 9/1997 | Gogan et al. | |
| 5,725,138 A | 3/1998 | Zagrodnik | |
| 5,779,303 A | 7/1998 | Kuelbs et al. | |
| 5,853,217 A | 12/1998 | Armstrong | |
| 5,931,360 A | 8/1999 | Reichert | |
| 6,338,260 B1 | 1/2002 | Cousins et al. | |
| 6,347,804 B1 | 2/2002 | Seibel | |
| 6,354,476 B1 | 3/2002 | Alderman | |
| 6,390,220 B1 | 5/2002 | Galbraith et al. | |
| 6,422,648 B1 | 7/2002 | Hanagain | |
| 6,443,344 B1 | 9/2002 | Nicosia et al. | |
| 6,484,911 B1 | 11/2002 | Doler et al. | |
| 6,484,914 B1 | 11/2002 | Willey | |
| 6,491,193 B2 | 12/2002 | Dudek et al. | |
| 6,648,408 B1 | 11/2003 | Grove | |
| 6,659,547 B2 | 12/2003 | Petersen | |
| 6,729,515 B2 | 5/2004 | Nicosia et al. | |
| 6,729,516 B2 | 5/2004 | Hanagan | |
| 6,793,110 B2 | 9/2004 | Hamilton | |
| 6,802,440 B1 | 10/2004 | Stowell | |
| 6,817,501 B1 | 11/2004 | Rogers et al. | |
| 6,840,344 B2 | 1/2005 | Galbraith et al. | |
| 6,840,417 B2 | 1/2005 | Heinrich et al. | |
| 6,840,704 B1 | 1/2005 | Monson | |
| 6,892,992 B2 | 5/2005 | Donahue | |
| 7,021,708 B2 | 4/2006 | Renner | |
| 7,090,280 B2 | 8/2006 | Willey | |
| 7,150,382 B2 | 12/2006 | Zickefoose | |
| 7,165,702 B1 | 1/2007 | Billberg | |
| 7,175,220 B2 | 2/2007 | Kashiwagi et al. | |
| 7,275,787 B1 | 10/2007 | Grove | |
| 7,290,832 B2 | 11/2007 | Hanagan | |
| 7,390,046 B2 | 6/2008 | Ostroski et al. | |
| 7,556,114 B2 | 7/2009 | Hanagan | |
| 7,628,120 B2 * | 12/2009 | Beeler | 119/496 |
| 2005/0140162 A1 | 6/2005 | Yamasaki | |
| 2006/0163302 A1 | 7/2006 | Knoch et al. | |
| 2010/0243691 A1 | 9/2010 | Salisbury | |

FOREIGN PATENT DOCUMENTS

| | | |
|---|---|---|
| JP | 2007-091140 | 4/2007 |
| KR | 10-2001-0104776 | 11/2001 |
| KR | 20-2008-0001726 | 6/2008 |

OTHER PUBLICATIONS

U.S. Appl. No. 12/732,146, filed Mar. 25, 2010, Rick Salisbury.
PCT Application PCT/US2011/045392; filing date Jul. 26, 2011; Rick Salisbury, International Search Report mailed Mar. 16, 2012.

* cited by examiner

LOW-PROFILE STORAGE APPARATUS FOR A MOTORCYCLE

RELATED APPLICATIONS

This application claims the benefit of U.S. Provisional Patent Application No. 61/368,520, filed Jul. 28, 2010, and entitled, "Low-Profile Storage Apparatus for a Motorcycle," which application is incorporated herein by reference in its entirety.

FIELD OF THE INVENTION

The present invention relates generally to storage devices for motorcycles, and more specifically to low-profile storage devices for motorcycles.

BACKGROUND OF THE INVENTION AND RELATED ART

Motorcycles often incorporate storage devices so that riders can safely and securely transport items on motorcycles. Storage devices are generally mounted at the rear of motorcycles. Some storage devices are mounted to the side of the rear wheel, while others are mounted above the rear wheel. Motorcycle storage devices are available in a variety of sizes, depending on the need. Some may be large enough to accommodate gear for an extended road trip, while others may be relatively small to accommodate just enough gear for a day trip or ride across town. Due to the variety of storage requirements, many riders may find it desirable to swap one size storage device for another size.

Storage devices may introduce weight distribution and balance problems, making motorcycle handling difficult. Storage devices mounted above the rear wheel, particularly large storage devices, generally present worse weight distribution and balance problems than side-mounted storage devices, so riders may prefer not to equip them unless necessary. Even many smaller size storage devices mounted above the rear wheel sit high above the wheel and have a high-profile. Thus, smaller size storage devices often present similar weight distribution and balance problems as the larger storage containers mounted above the rear wheel.

SUMMARY OF THE INVENTION

In light of the problems and deficiencies inherent in the prior art, the present invention seeks to overcome these by providing a low-profile storage apparatus for a motorcycle.

In accordance with the invention as embodied and broadly described herein, the present invention resides in a low-profile storage apparatus for a motorcycle. In one aspect of the present invention, the low-profile storage apparatus for a motorcycle comprises a base attachable to a motorcycle. In another aspect of the present invention, the storage apparatus comprises a shell supported about the base, and movable between a stowing position and an open position. In a further aspect of the present invention, the storage apparatus comprises at least one storage compartment supported by an underside of the shell, the at least one storage compartment having an opening accessible upon the shell being positioned in the open position.

In one aspect of the present invention, the storage apparatus may comprise a rotatable coupling between the base and the shell to enable movement of the shell between the stowing position and the open position.

In another aspect of the present invention, the base comprises an open bottom end that exposes the at least one storage compartment from the bottom end when the shell is in the stowing position. In yet another aspect, the base comprises a closed bottom end that provides an enclosure for the at least one storage compartment when the shell is in the stowing position. In a particular aspect, the closed bottom end comprises a bottom barrier.

In a further aspect of the present invention, the shell is removably attached to the base. In yet a further aspect, the shell is lockable to the base preventing the shell from moving toward the open position.

In one aspect of the present invention, at least one storage compartment is defined, at least in part, by the shell and a vertical partition. In another aspect, the at least one storage compartment is defined, at least in part, by the shell and a horizontal partition. In still another aspect, at least a portion of the at least one storage compartment is attached to the base, causing the opening of the at least one storage compartment to enlarge when the shell is moved toward the open position. In yet another aspect, the at least one storage compartment comprises a plurality of storage compartments. In a further aspect, the at least one storage compartment comprises a container having an opening formed therein. In a specific aspect, the container is removably secured to the shell. In another specific aspect, the shell is configured to extend at least partially across a side-mount storage apparatus, such that access to an opening of the side-mount storage apparatus is prevented when the shell is positioned in the stowing position and wherein the shell is movable away from the side-mount storage apparatus to permit access to the opening of the side-mount storage apparatus.

The present invention also resides in a low-profile storage apparatus for a motorcycle. In one aspect of the present invention, storage apparatus comprises a base attachable to a rear portion of a motorcycle. In another aspect of the present invention, the storage apparatus comprises a shell rotatably attached to the base, and movable between a stowing position and an open position, the shell having a cargo support on a top side of the shell configured to receive and secure cargo to the top side of the shell. In yet another aspect of the present invention, the storage apparatus comprises at least one storage compartment supported by an underside of the shell, the storage compartment having an opening accessible upon the shell being positioned in the open position.

The present invention also resides in a method of storing an item on a motorcycle. In one aspect of the present invention, the method comprises obtaining a low-profile storage apparatus having a shell supported about a base and at least one storage compartment supported by an underside of the shell, the base being coupled to a motorcycle. In another aspect of the present invention, the method comprises positioning the shell in an open position to provide access to an opening of the at least one storage compartment. In still another aspect of the present invention, the method comprises causing an item to be stored in the at least one storage compartment. In yet another aspect of the present invention, the method comprises positioning the shell in a stowing position to prevent access to the opening of the at least one storage compartment.

In one aspect of the present invention, the method comprises locking the shell in the stowing position to prevent moving the shell toward the open position. In another aspect of the present invention, the method comprises retrieving the item from the at least one storage compartment by moving the shell to the open position to provide access to the opening of the at least one storage compartment and removing the item from the at least one storage compartment. In yet another aspect of the present invention, the method comprises detaching the shell from the base.

The present invention also resides in a storage system for a motorcycle. In one aspect of the present invention, the storage system comprises a side-mount storage apparatus secured to the motorcycle. In another aspect of the present invention, the storage system comprises a low-profile storage apparatus secured to the motorcycle. In yet another aspect of the present invention, the storage apparatus comprises a shell movable between a stowing position and an open position. In still another aspect of the present invention, the storage apparatus comprises at least one storage compartment supported by an underside of the shell, wherein the shell of the low-profile storage apparatus extends at least partially across the side-mount storage apparatus, such that access to an opening of the side-mount storage apparatus is prevented when the shell is positioned in the stowing position, and wherein the shell is movable away from the side-mount storage apparatus to permit access to the opening of the side-mount storage apparatus. In a further aspect of the present invention, the shell comprises a lid to the opening of the side-mount storage apparatus.

BRIEF DESCRIPTION OF THE DRAWINGS

The present invention will become more fully apparent from the following description and appended claims, taken in conjunction with the accompanying drawings. Understanding that these drawings merely depict exemplary embodiments of the present invention they are, therefore, not to be considered limiting of its scope. It will be readily appreciated that the components of the present invention, as generally described and illustrated in the figures herein, could be arranged and designed in a wide variety of different configurations. Nonetheless, the invention will be described and explained with additional specificity and detail through the use of the accompanying drawings in which:

DETAILED DESCRIPTION OF EXEMPLARY EMBODIMENTS

The following detailed description of exemplary embodiments of the invention makes reference to the accompanying drawings, which form a part hereof and in which are shown, by way of illustration, exemplary embodiments in which the invention may be practiced. While these exemplary embodiments are described in sufficient detail to enable those skilled in the art to practice the invention, it should be understood that other embodiments may be realized and that various changes to the invention may be made without departing from the spirit and scope of the present invention. Thus, the following more detailed description of the embodiments of the present invention is not intended to limit the scope of the invention, as claimed, but is presented for purposes of illustration only to describe the features and characteristics of the present invention, and to sufficiently enable one skilled in the art to practice the invention. Accordingly, the scope of the present invention is to be defined solely by the appended claims.

The following detailed description and exemplary embodiments of the invention will be best understood by reference to the accompanying drawings, wherein the elements and features of the invention are designated by numerals throughout.

U.S. patent application Ser. No. 12/732,146, filed on Mar. 25, 2010, and titled "Displaceable Utility Positioning System for Motorcycles" is incorporated by reference herein in its entirety.

The present invention describes an apparatus, method, and system for a low-profile storage apparatus for a motorcycle. The low-profile storage apparatus may be mounted to a motorcycle above the rear wheel. The low-profile storage apparatus may comprise a base attachable to the motorcycle, a shell supported about the base, and at least one storage compartment supported by an underside of the shell. The shell may be movable between a stowing position and an open position. In the open position, an opening of the at least one storage compartment may be accessible to deposit or retrieve items for stowing.

The present invention provides several significant advantages over prior related storage devices for motorcycles, some of which are recited here and throughout the following more detailed description. First, the low-profile storage apparatus may minimize weight distribution and balance problems associated with storage devices mounted above the rear wheel of a motorcycle. Second, the low-profile storage apparatus may conceal a storage compartment that is supported by an underside of a shell. Third, the low-profile storage apparatus may be configured to extend at least partially across a side-mounted storage device, preventing access to the side-mounted storage device until the low-profile storage apparatus is moved away from the side-mounted storage device. This may provide a security feature for the side-mounted device. Fourth, the shell and storage compartment of the low-profile storage apparatus may be configured to be easily removed from the motorcycle, leaving a base that may be configured to support other storage devices or an additional seat. Fifth, the low-profile storage apparatus may provide a cargo support on a top side of the storage apparatus.

Each of the above-recited advantages will be apparent in light of the detailed description set forth below, with reference to the accompanying drawings. These advantages are not meant to be limiting in any way. Indeed, one skilled in the art will appreciate that other advantages may be realized, other than those specifically recited herein, upon practicing the present invention.

Figure 1:
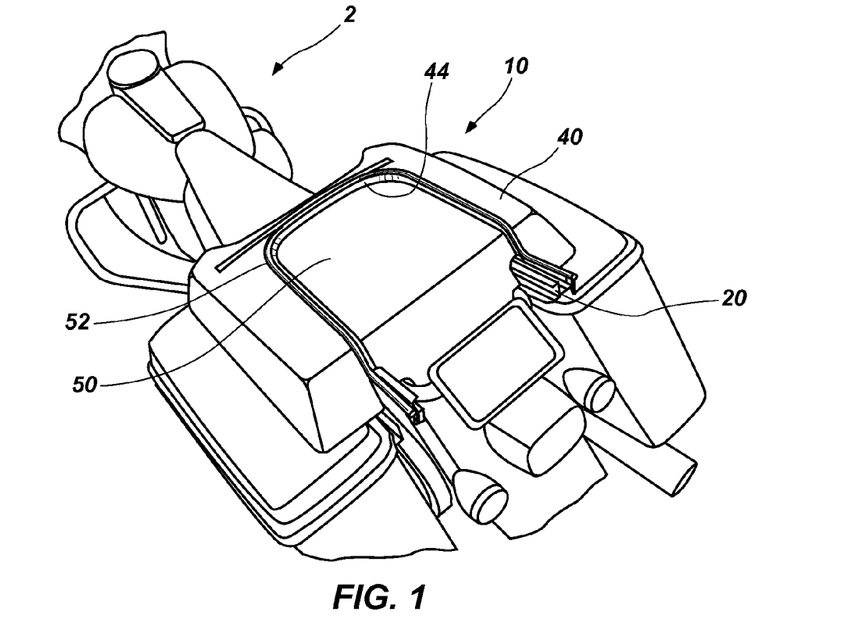
FIG. 1 illustrates a rear perspective view of a low-profile storage apparatus for a motorcycle in accordance with an exemplary embodiment of the present invention.
Figure 2:
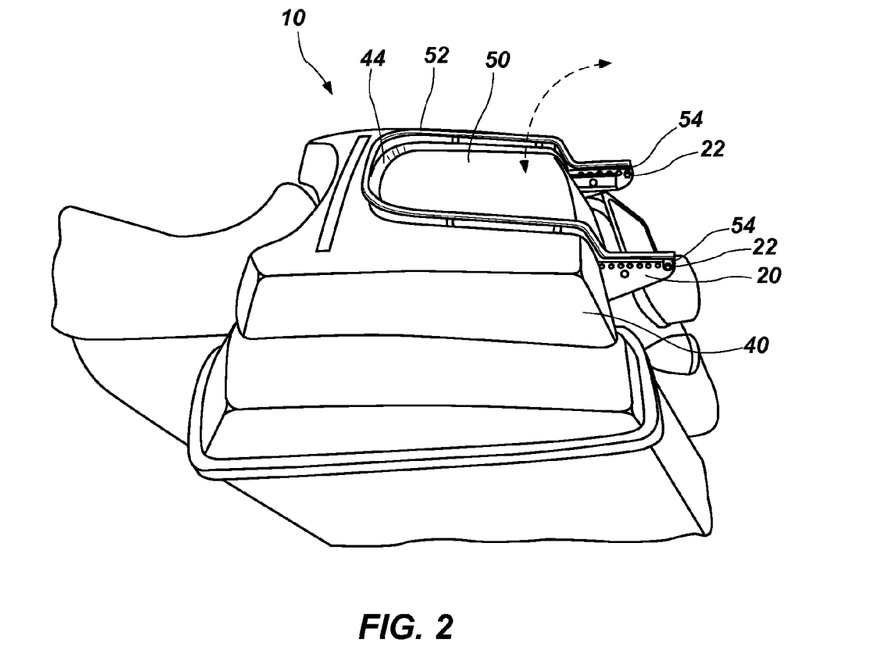
FIG. 2 illustrates a side perspective view of the low-profile storage apparatus of FIG. 1.
Figure 6:
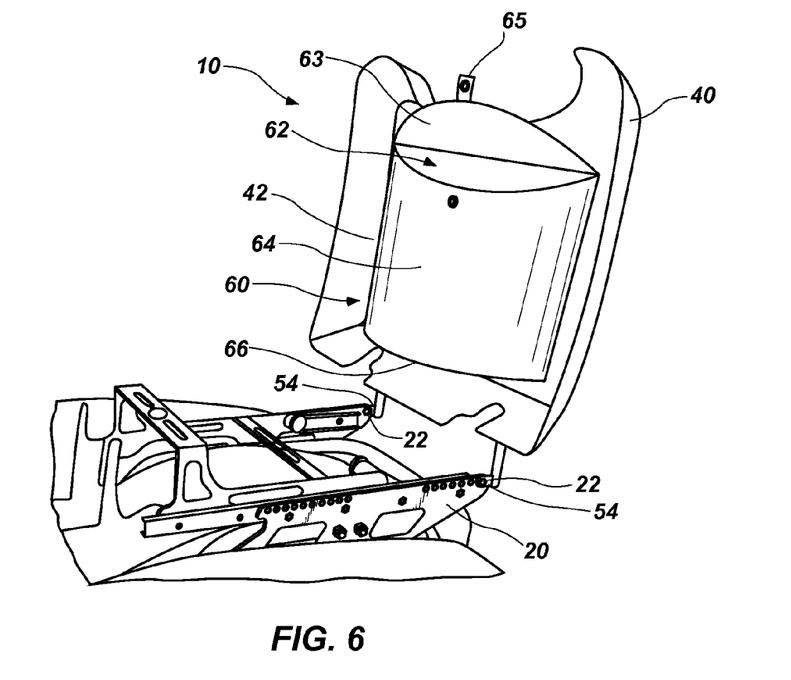
FIG. 6 illustrates a side perspective view of a storage compartment supported by an underside of a shell in accordance with an exemplary embodiment of the present invention.

Referring to FIGS. 1 and 2, illustrated is a low-profile storage apparatus 10 for a motorcycle 2. In the figures, the storage apparatus 10 is depicted as being attached to the motorcycle 2. However, the storage apparatus 10 may be separate from, and attachable to, the motorcycle 2. The storage apparatus 10 may comprise a base 20 that may be attachable to the motorcycle 2. In some embodiments, discussed below, the base may remain on the motorcycle to support other storage devices or an additional seat for the motorcycle. The storage apparatus 10 may further comprise a shell 40. The shell 40 may be supported about the base 20. Additionally, the storage apparatus 10 may comprise at least one storage compartment (e.g., as shown in FIG. 6) supported by an underside of the shell 40. The shell 40 may be movable between a stowing position and an open position. When the shell 40 is positioned in the open position (e.g., as shown in FIG. 6), for example, the storage compartment may have an opening that is accessible. On the other hand, when the shell 40 is in the stowing position (as shown in FIGS. 1 and 2), the opening of the storage compartment may not be accessible. The storage compartment is discussed in more detail below.

The base 20 may be configured to attach to a rear portion of a motorcycle 2, as shown. Alternatively, the base 20 may be configured to attach to another portion of the motorcycle 2, such as a side or front portion of the motorcycle 2. For example, the base 20 may be configured to attach to a fender, frame, or any other structural member or combination thereof of a motorcycle 2. The base 20 may be configured to attach to the motorcycle 2 with threaded fasteners, clamps, clips, snaps, welds, crimps, interference fit, or any other suitable attachment means for the base 20 to the motorcycle 2. The base 20 may be constructed of metal, such as steel, aluminum, or titanium, composite material, such as carbon fiber, polymeric material, such as plastic, or any other structural material, or combination thereof, suitable for the base 20.

Generally, the base 20 of the low-profile storage apparatus 10 of the present invention may include a fixed or stationary mounting assembly comprised of two side mounts 28, 29 that secure to the motorcycle in some manner and that are located about opposite sides of the rear fender of the motorcycle. The side mounts 28, 29 can be configured to attach to the structural frame of the motorcycle with bolt holes that match the locations of the existing bolt holes or mounting points in the frame, so that installation is made easy. For instance, using pre-existing bolt patterns, a user of the apparatus may only be required to remove the side fairings or covers secured to the rear fender and attach the side mounts 28, 29 to begin installing the storage apparatus to the motorcycle. Alternatively, the side mounts 28, 29 of the mounting assembly may also be configured to attach to other structural members of the motorcycle using either pre-existing or newly formed attachment points, or both, if necessary.

The shell 40 may be supported about the base 20, at least in part, by a coupling to the base 20. A coupling between the base 20 and the shell 40 may enable movement of the shell 40 between the stowing position and the open position. In one embodiment, the coupling may be a rotatable coupling 22. In another embodiment, the coupling may be a sliding coupling. The coupling of the shell 40 to the base 20 may be a permanent coupling or a removable coupling. A removable coupling of the shell 40 to the base 20 may be attachable and/or detachable with or without the use of tools. For example, the shell 40 may be coupled to the base with pins, clamps, rods, screws, bolts, nuts, clips, or any other suitable fastener for coupling the shell 40 to the base 20. Fasteners such as pins, clips, rods, screws, or bolts may have handles or other features configured for grasping to allow a user to attach/detach the shell 40 and the base 20 without the use of tools. The shell 40 may be constructed of metal, such as steel, aluminum, or titanium, composite material, such as carbon fiber or fiberglass, polymeric material, such as plastic, or any other structural material, or combination thereof, suitable for the shell 40.

In some embodiments, the shell 40 may comprise a cargo support. The cargo support may be located on a top side 44 of the shell 40. The cargo support may comprise a cargo receiving portion 50 and/or a cargo securing portion 52. The cargo receiving portion 50 may be configured to provide an area for cargo to be placed. The cargo receiving portion 50 may comprise a relatively flat horizontal region sized to receive luggage or other cargo. Additionally, the cargo receiving portion 50 may comprise vertical regions that may serve to provide a boundary for the cargo on the cargo support. The securing portion 52 may be configured to provide attaching locations for fastening or securing means for cargo. The cargo securing portion 52 may comprise a raised rod (as shown), hooks, loops, or any other suitable securing means or combination thereof for cargo on a cargo support. In some embodiments, the cargo securing portion 52 may be attached to the top side 44 of the shell 40. In a particular embodiment, the cargo securing portion 52 may be used to couple the shell 40 to the base 20. For example, an end of the cargo securing portion 52 may have a tab 54 configured for attachment of a rotatable coupling 22 between the shell 40 and the base 20.

Figure 3:
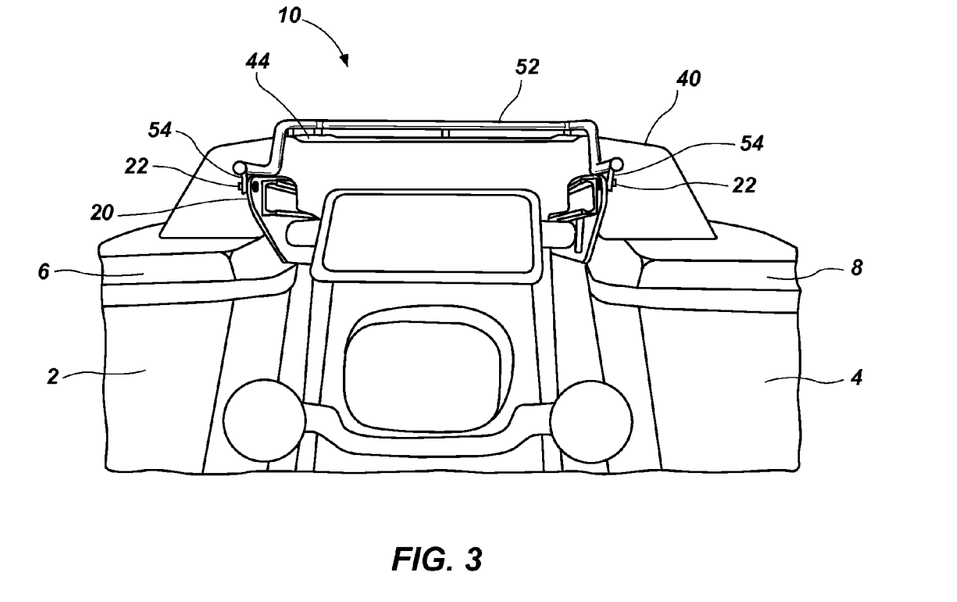
FIG. 3 illustrates a rear view of the low-profile storage apparatus of FIG. 1.

Referring to FIG. 3, illustrated is a rear view of the storage apparatus 10 attached to the motorcycle 2. Side-mount storage apparatus 2 and side-mount storage apparatus 4 are shown attached to the motorcycle 2. Side-mount storage apparatus 2 and 4 have lids 6 and 8, respectively. In this embodiment, shell 40 is configured to extend at least partially across side-mount storage apparatus 2 and 4 when in the stowing position. By extending at least partially across side-mount storage apparatus 2 and 4, the shell 40 may prevent the lids 6 and 8 from opening. Thus, in this embodiment, the shell 40 is configured to prevent access to openings of the side mount storage apparatus 2 and 4 when positioned in the stowing position. This configuration may provide an enhanced security feature of the side mount storage apparatus 2 and 4 because access to the openings may not be available until the shell 40 is moved away from the side-mount storage apparatus 2 and 4. Alternatively, the shell may be configured to extend at least partially across only side-mount storage apparatus 2 when in the stowing position. Thus, in this embodiment, the shell may only prevent lid 6 from opening when the shell is in the stowing position.

The shell 40 may be prevented from moving from the side-mount storage apparatus 2 and 4 by a latch or locking mechanism. Thus, in one embodiment, the shell 40 may be lockable to the base 20 to prevent the shell 40 from moving away from the side-mount storage apparatus. In another embodiment, the shell 40 may be lockable to a side-mount storage apparatus 2 and/or 4 to prevent the shell 40 from moving away from the side-mount storage apparatus. In either case, when the shell 40 is moved away from the side mount storage apparatus 2 and 4, it may permit access to the opening of the side-mount storage apparatus 2 and 4.

In another embodiment, not shown, a side-mount storage apparatus may not have its own lid, as in the example above. In this embodiment, a shell may be configured to extend over an opening of the side-mount storage apparatus, covering the opening. Thus, in this embodiment, the shell may serve as a lid for the side-mount storage apparatus. As in the previous embodiments discussed above, the shell 40 may prevent access to the opening of the side-mount storage apparatus when positioned in the stowing position and the shell 40 may permit access to the opening of the side-mount storage apparatus when moved away from the side-mount storage apparatus.

Figure 4:
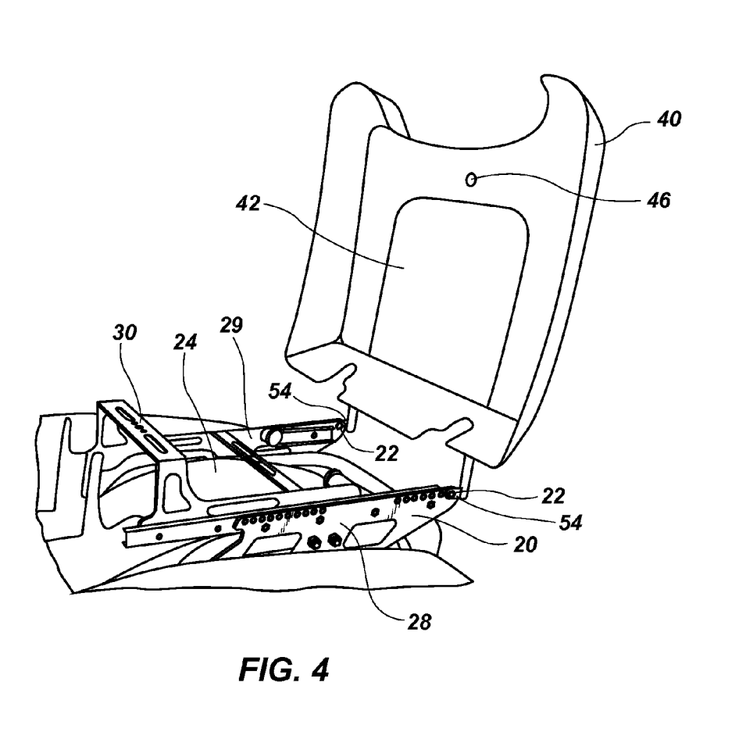
FIG. 4 illustrates a side perspective view of a shell and a base of the low-profile storage apparatus in accordance with an exemplary embodiment of the present invention, wherein the shell is in an open position and the base has an open bottom end.
Figure 5A:
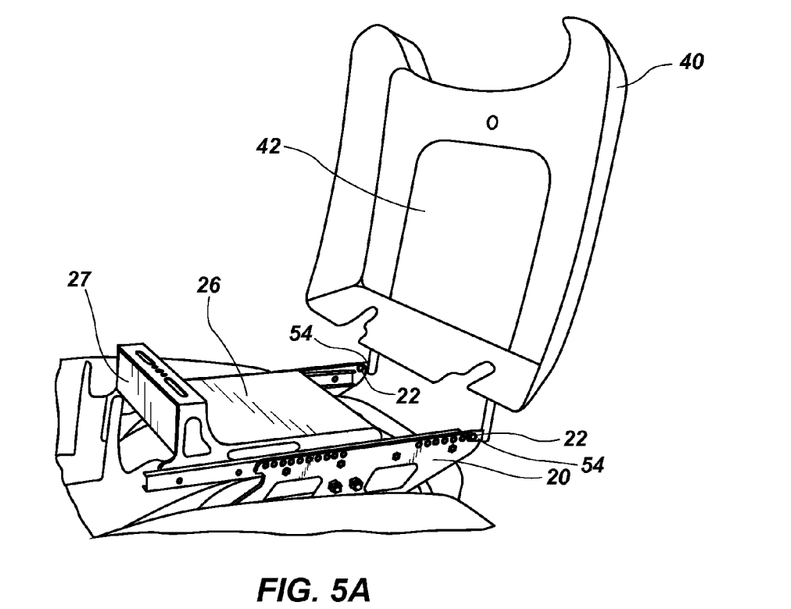
FIG. 5A illustrates a side perspective view of a shell and a base of the low-profile storage apparatus in accordance with an exemplary embodiment of the present invention, wherein the shell is in an open position and the base has a closed bottom end.
Figure 5B:
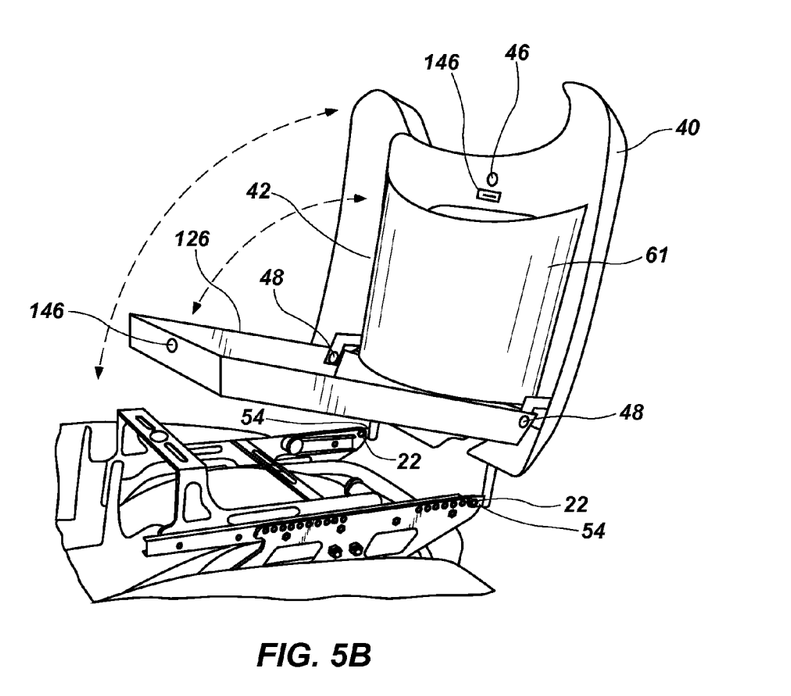
FIG. 5B illustrates a side perspective view of a shell and a base of the low-profile storage apparatus in accordance with an exemplary embodiment of the present invention, wherein the shell is in an open position and supports a bottom barrier.

Referring to FIGS. 4, 5A, and 5B, illustrated is a shell 40 and a base 20, with the shell 40 in the open position. For convenience, a storage compartment is not shown in these views. The figures depict an underside 42 of the shell 40. The storage compartment may be supported by the underside 42 of the shell 40. The storage apparatus may include a lock 46 to prevent the shell 40 from moving from the stowing position. Additionally, the lock 46 may be configured to engage a locking feature 30 of the base 20 to prevent the shell 40 from moving from the stowing position. A rotatable coupling 22 is also shown between the base 20 and the shell 40. The rotatable coupling may enable movement of the shell 40 between the stowing position and the open position.

In some embodiments, as illustrated in FIG. 4, the base 20 may comprise an open bottom end 24. The open bottom end may expose a storage compartment from the bottom end when the shell 20 is in the stowing position. In other embodiments, as illustrated in FIG. 5A, the base 20 may comprise a closed bottom end that may contribute to forming a protective boundary about a storage compartment when the shell 40 is in the stowing position. In this embodiment, the enclosure may comprise a bottom barrier 26 and/or a front barrier 27. The bottom barrier 26 and the front barrier 27 may be integral to the base 20 or they may be separate components. If the bottom barrier 26 and the front barrier 27 are separate components, they may be permanently or removably attached to the base 20. For example, the bottom barrier 26 may be rotatably coupled to the base 20 (not shown). In one aspect of this embodiment, the bottom barrier 26 and the front barrier 27 may be configured to provide protection for the storage compartment from the elements. For example, plastic may be snapped to the base to provide splash protection for the storage compartment. In another aspect, the bottom barrier 26 and the front barrier 27 may be configured to provide the storage compartment with enhanced protection for security purposes. In this case, a sturdy material may be securely fastened to the base to provide a significant barrier to accessing the storage container from the bottom end of the base.

In still other embodiments, as illustrated in FIG. 5B, a bottom barrier 126 may be supported by the shell 40. As in the embodiment discussed above in FIG. 5A, the bottom barrier 126 may be configured to provide protection for a storage compartment 61 from the elements or to provide additional protection for security purposes. In this embodiment, the bottom barrier 126 may be supported, at least in part, by a rotatable coupling 48 with the shell 40. The rotatable coupling 48 may provide a permanent or detachable coupling between the bottom barrier 126 and the shell 40. The rotatable coupling 48 may be located on the underside 42 of the shell 40 or it may be located at or near the rotatable coupling 22 between the shell 40 and the base 20. The shell 40 and bottom barrier 126 may include a latch or locking mechanism 146 to secure the bottom barrier 126 to the shell 40 and to prevent the bottom barrier 126 from rotating about the rotatable coupling 48 relative to the shell 40. In one embodiment, the rotatable coupling 48 may be located at the rotatable coupling 22 such that they share an axis of rotation. In this embodiment, the latch or lock 46 may be released independently of latch or lock 146 such that the shell 40 may be moved from the stowing position while the bottom barrier 126 is still latched or locked in position relative to the shell 40. Thus, in this case, an opening of a storage compartment may not be accessible until after the bottom barrier 126 has been moved away from the shell 40, such as by releasing the latch or lock 46.

In certain embodiments, a storage compartment may comprise the bottom barrier 126. In an aspect of this embodiment, the storage compartment may comprise both compartment 61 and the bottom barrier 126. In a particular aspect of this embodiment, a compartment for storage may be supported by the bottom barrier 126, which is, in turn, supported by the shell. In another aspect of this embodiment, compartment 61 may not be present. In this case, the bottom barrier 126 may serve as a compartment for storage by itself, without an additional compartment. In some embodiments, the compartment 61 may be permanently attached to the shell 40. Alternatively, in other embodiments, the compartment 61 may be removably attached to the shell 40.

In use, a user may position the shell in the open position to provide access to the opening of the storage compartment. Once in the open position, if an item is in the storage compartment, the user may retrieve the item from the storage compartment. If desired, the user may deposit an item in the storage compartment. The user may then position the shell in the stowing position to prevent access to the opening of the storage compartment. Optionally, the user may lock the shell in the stowing position to prevent moving the shell from the stowing position and, thus, making the opening of the storage compartment accessible. In some cases, it may be desirable to detach the shell, along with the storage compartment, from the base. This may be done regardless of whether an item is being stored in the storage compartment. In another situation, the user may detach only the storage compartment from the shell. In this situation, the user may continue to use the detached storage compartment for convenient storage of an item even when away from the motorcycle.

Referring to FIG. 6, illustrated is a storage compartment 60 of a storage apparatus 10. The storage compartment 60 may be supported by the underside 42 of the shell 40. In this embodiment, the storage compartment 60 may be defined, at least in part, by the shell 40 and a partition 64. A partition that comprises a horizontal portion when the shell 40 is in the stowing position may be referred to as a horizontal partition. In this embodiment, the center portion of partition 64 is configured to be substantially horizontal when the shell 40 is in the stowing position. Thus, the partition 64 is a horizontal partition. FIG. 6 further illustrates that the storage compartment 60 may be defined, at least in part, by the shell 40 and a partition 66. A partition that comprises a vertical portion when the shell 40 is in the stowing position may be referred to as a vertical partition. In this embodiment, the partition 66 is configured to be substantially vertical when the shell 40 is in the stowing position. Thus, the partition 66 is a vertical partition. In some embodiments, a partition may have both horizontal and vertical portions. In this case, the partition is both a horizontal partition and a vertical partition. Moreover, a cover may be a horizontal and/or a vertical partition.

Vertical and horizontal partitions may be constructed of any textile material, leather, polymer, metal, composite, wood, natural or synthetic rubber, or any combination thereof. Also illustrated, is the accessibility of an opening 62 of the storage compartment 60 when the shell 40 is in the open position. This embodiment further demonstrates that the storage compartment 60 may include a cover 63 over the opening 62. The cover 63 may comprise a fastener 65 to secure the cover 63 in place over the opening 62 of the storage compartment 60. A fastener 65 may be a snap, button, zipper, hook and loop, buckle, lace, tie, strap, clip, or any other suitable fastener for a cover 63 of a storage compartment 60. As seen through opening 62 of the storage compartment 60, the shell 40 may form a side of the storage compartment 60. In some embodiments, the storage compartment 60 may be permanently attached to the shell 40. Alternatively, in other embodiments, the storage compartment 60 may be removably attached to the shell 40.

Figure 7:
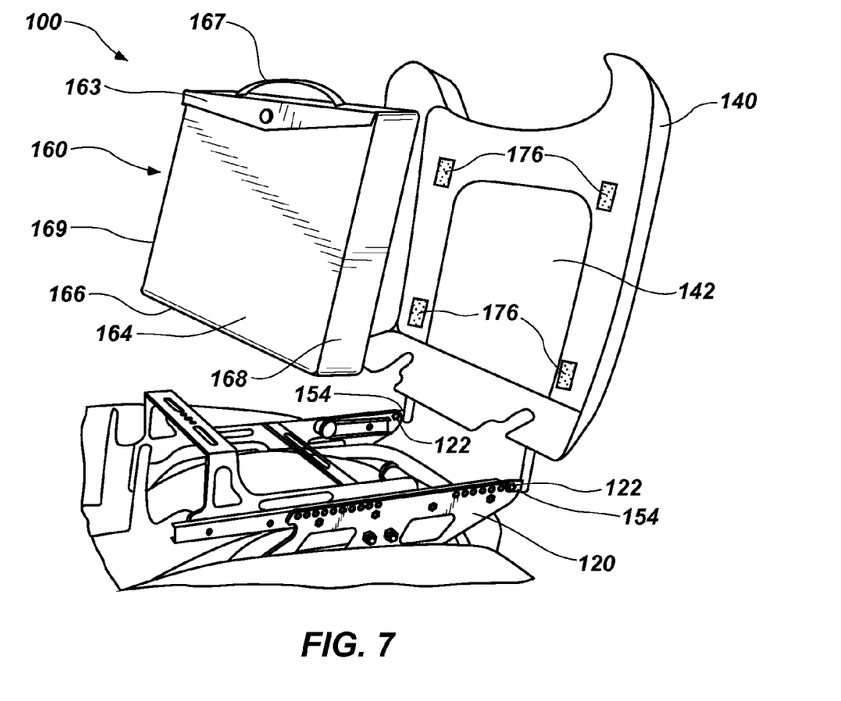
FIG. 7 illustrates a side perspective view of a storage compartment separate from a shell in accordance with an exemplary embodiment of the present invention.

Referring to FIG. 7, illustrated is an embodiment of a storage compartment of a storage apparatus 100. In some embodiments, a storage compartment may have a plurality of horizontal and/or vertical partitions. For example, storage compartment 160 has at least three vertical partitions (166, 168, and 169) and at least two horizontal partitions (164 and a parallel partition, not shown, configured to be adjacent to the underside 142 of the shell 140). Moreover, cover 163 may have at least a vertical portion and, thus, may be considered a vertical partition. FIG. 7 further illustrates that a horizontal or a vertical partition need not be connected, or even adjacent, to the underside of the shell. For example, vertical partition 164 is not connected, or adjacent, to the shell 140.

Further, in this embodiment, the storage compartment comprises a container 160. The container 160 may be removably secured to the underside 142 of the shell 140. The container 160 may have an opening for depositing or retrieving stored items. In this figure, the opening is obscured from view by the cover 163. The cover 163 may include a handle 167 for carrying the container 160 when separated from the underside 142 of the shell 140. Fasteners 176 may be used to removably attach the container 160 to the underside 142 of the shell 140. Fasteners 176 may comprise brackets, straps, elastics, bungee cords, clips, hooks, hook and loop fasteners, or any other device or combination of devices that may removably attach the container 160 to the underside 142 of the shell 140. In certain embodiments, the container 160 may be retrofitted to removably attach to the underside 142 of the shell 140. For example, a container of a suitable size and shape may be fitted with fastener 176 hardware to enable the container to be removably attached to the underside 142 of the shell 140.

Figure 8:
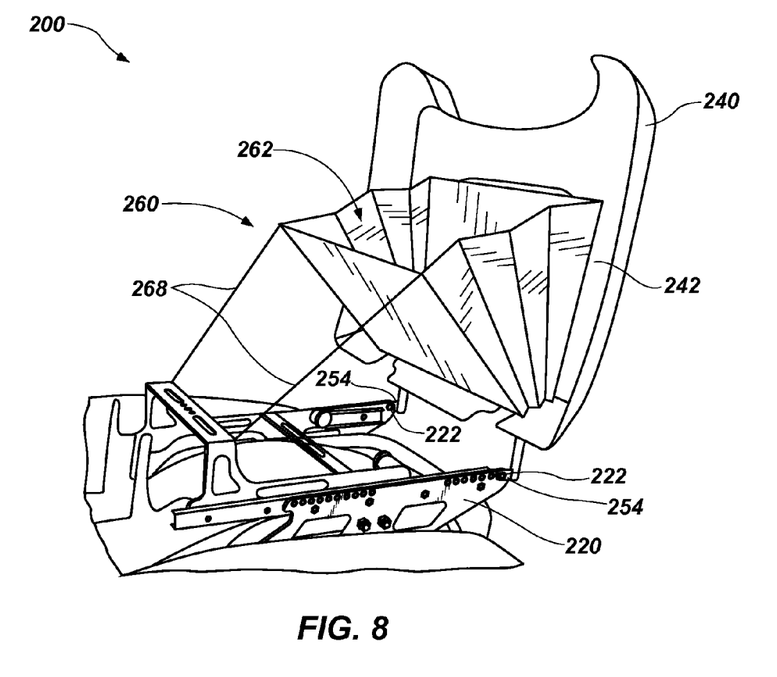
FIG. 8 illustrates a side perspective view of a storage compartment supported by an underside of a shell having a portion attached to a base in accordance with an exemplary embodiment of the present invention.

Referring to FIG. 8, illustrated is an embodiment of a storage compartment of a storage apparatus 200. In this embodiment, at least a portion of the storage compartment 260 may be attached to the base 220. Such an attachment may cause the opening 262 of the storage compartment 260 to enlarge when the shell 240 is moved toward the open position. In this embodiment, the portion of the storage compartment 260 attached to the base 220 are tethers 268. In another embodiment, the portion of the storage compartment attached to the base may be a portion of the storage compartment that forms the opening 262. Also illustrated in this figure is that the storage compartment 260 may be configured to expand and contract, in an accordion-like manner in this case. This expandable quality may make it easier to deposit or retrieve stored items in the storage container. Although not shown in the figure, the storage compartment 260 may include a cover over the opening 262.

Figure 9:
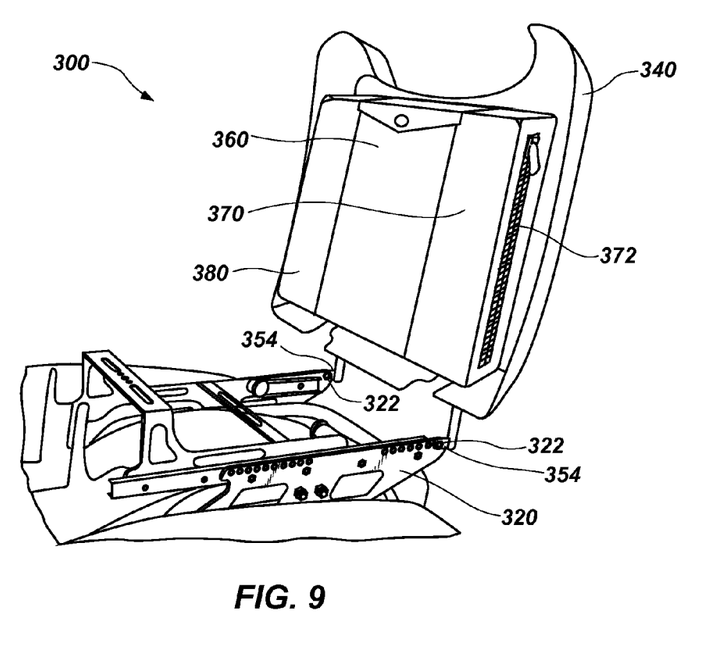
FIG. 9 illustrates a side perspective view of a plurality of storage compartments supported by an underside of a shell in accordance with an exemplary embodiment of the present invention.

Referring to FIG. 9, illustrated is an embodiment of a storage apparatus 300 having a plurality of storage compartments. In this embodiment, storage compartments 360, 370, and 380 are shown supported by the shell 340. In certain aspects of this embodiment, the storage compartments 360, 370, and 380 may be coupled together or integrally connected to each other. In certain other aspects of this embodiment, the storage compartments 360, 370, and 380 may be separate and individual storage compartments, each separately supported by the shell 340. Each storage compartment 360, 370, and 380 may include an opening. The storage compartments 360, 370, and 380 may or may not include covers for the openings. In some embodiments, a storage compartment may include an opening on a side, as shown for the zippered opening 372 of storage compartment 370.

In certain embodiments, the shell of the low-profile storage apparatus may be removed from the base and replaced with a different storage device or an additional seat for the motorcycle. In certain aspects of this embodiment, the base may be configured to slidably position the different storage device or additional seat along the length of the base.

Figure 10:
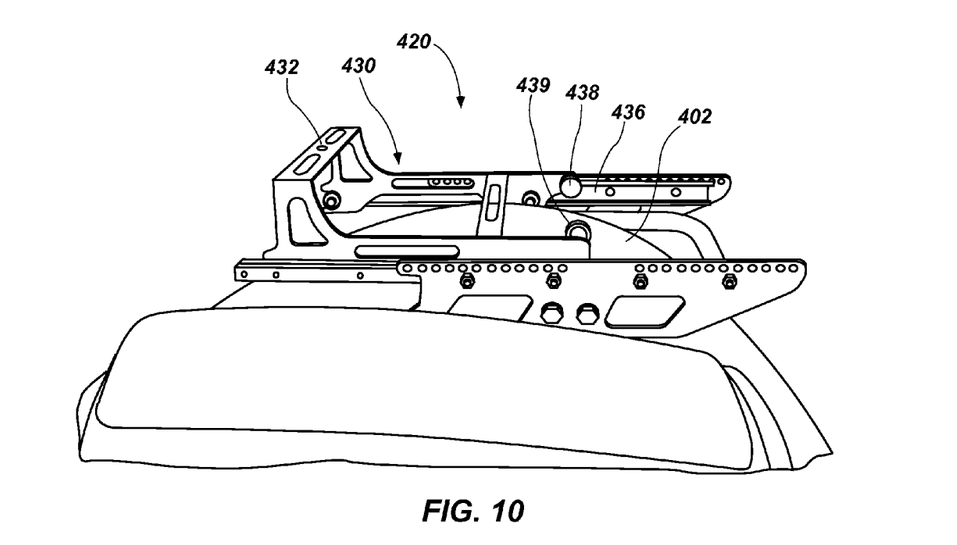
FIG. 10 illustrates a side perspective view of a base having a movable carriage in accordance with an exemplary embodiment of the present invention.
Figure 11:
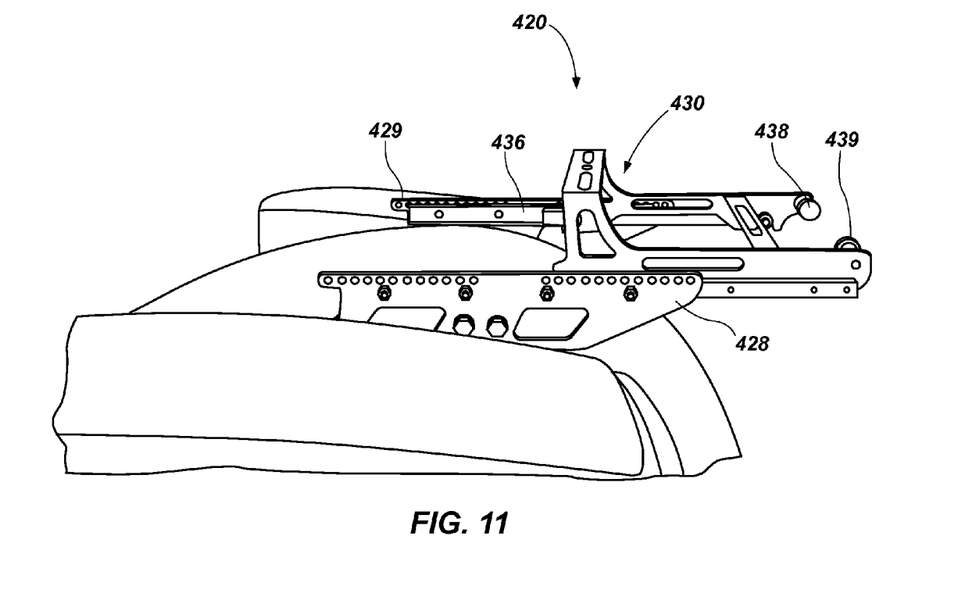
FIG. 11 illustrates a side perspective view of the base and movable carriage of FIG. 10, wherein the movable carriage is extended to the rear of the motorcycle.

Referring to FIGS. 10 and 11, illustrated is an embodiment of a base comprising a moveable carriage. The base 420 of the storage apparatus may include a moveable carriage 430 that is slidably coupled to the base 420. The base 420 may comprise side mounts 428, 429 that may attach the base 420 to the motorcycle. Thus, the moveable carriage 430 may be slidably coupled to, and span the gap between, the side mounts 428, 429, over the top of the rear fender 402. The carriage 430 may also provide a top platform surface 432 that may be configured to support the shell of the storage apparatus.

The moveable carriage 430 can be slidably coupled to the mounting system with a sliding mechanism 436, such as linear bearings, slide rails or similar devices, etc., that allow the carriage to displace back and forth along a single axis of motion. Furthermore, the sliding mechanism 436 can be configured to provide a line of contact or numerous points of contact, rather than just two points of contact, between the fixed mounting assembly and the moveable carriage 430 in order to impart a high degree of structural rigidity and stiffness to the positioning and seating system. In one aspect, a linear bearing sliding mechanism can be telescoping in both directions along the axis of motion, to allow more than half of the length of the sliding rail of the bearing (including the carriage and the attached storage unit or seat) to extend outwards from the ends of the fixed rail of the bearing in either direction.

The base 420 may also include one or more locking devices 438, 439 which secure the moveable carriage 430 to the fixed or stationary mounting system across a range of positions above the rear fender 402 of a motorcycle. A wide variety of locking devices 438, 439 and methods can be used to secure the moveable carriage 430, including mechanisms which provide a continuous range of positions, such as a friction brake, as well as mechanisms which provide a plurality of incremental securable positions separated by discrete intervals, such as a locking plunger with a corresponding series of plunger holes. The locking device 438, 439 can be configured to allow for the easy adjustment of the position of the moveable carriage 430 by a single user, while still protecting against the inadvertent displacement of the moveable components of the positioning system when motorcycle is in motion.

In the embodiment illustrated, a shell may be configured to couple with the side-mounts 428, 429 of the base 420. Thus, in this embodiment, the shell would not move with the movable carriage 430, which may move relative to the base 420. In other embodiments, however, a shell may be coupled to a movable carriage and thus, may move with the movable carriage, relative to the base.

Figure 12:
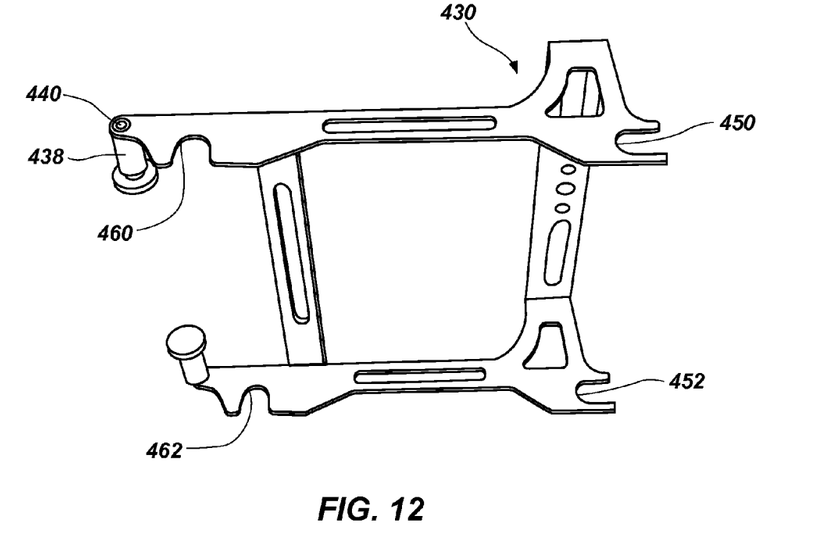
FIG. 12 illustrates a movable carriage separate from a base in accordance with an exemplary embodiment of the present invention.
Figure 13:
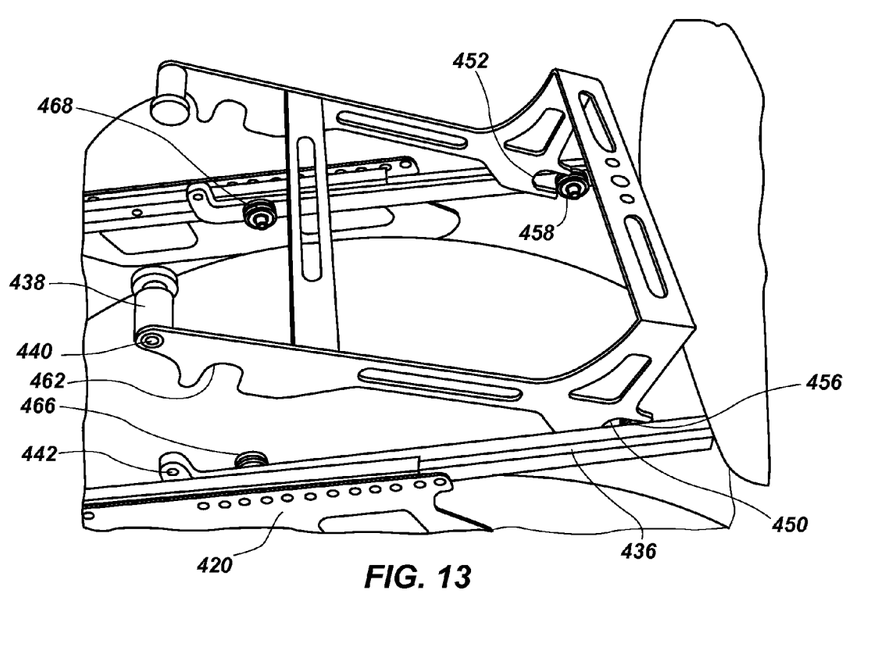
FIG. 13 illustrates the movable carriage of FIG. 12 coupling/decoupling with the base in accordance with an exemplary embodiment of the present invention.

Referring to FIGS. 11 and 12, illustrated is the movable carriage 430 separate from the rest of the base 420. The movable carriage 430 may be coupled to the base 420 by moving the sliding mechanism 436 to a forward-most position on the base, and then tilting the movable carriage 430 at an angle relative to the base 420 while moving the carriage 430 in a forwardly direction until the front attachment notches 450, 452 engage with a set of front attachment journals 456, 458 formed into the sliding mechanism 436. The movable carriage 430 may then be rotated downwardly until the rear attachment notches 460, 462 engage with a set of rear attachment journals 466, 468 also formed into the sliding mechanism 436. Finally, the spring-loaded pin 440 in the locking device 438 may be inserted into the pin hole 442 in the sliding mechanism 436 to lock and secure the movable carriage 430 and the sliding mechanism 436 together.

The reverse procedure of disengaging or removing the spring-loaded pin 440 from the pin hole 442, rotating the rear attachment notch 460, 462 up and away from the rear attachment journal 466, 468, and sliding the front attachment notch 450, 452 back and away from the front attachment journal 456, 458 may be used to remove or decouple the movable carriage 430 from the sliding mechanism 436.

In embodiments of the base that utilize a movable carriage or other mounting structure for attaching different storage devices or seats, the shell may be configured to cover the movable carriage or mounting structure and hide it from view. Thus, the shell may serve as a cosmetic covering as well as a support for the storage compartment.

Figure 14:
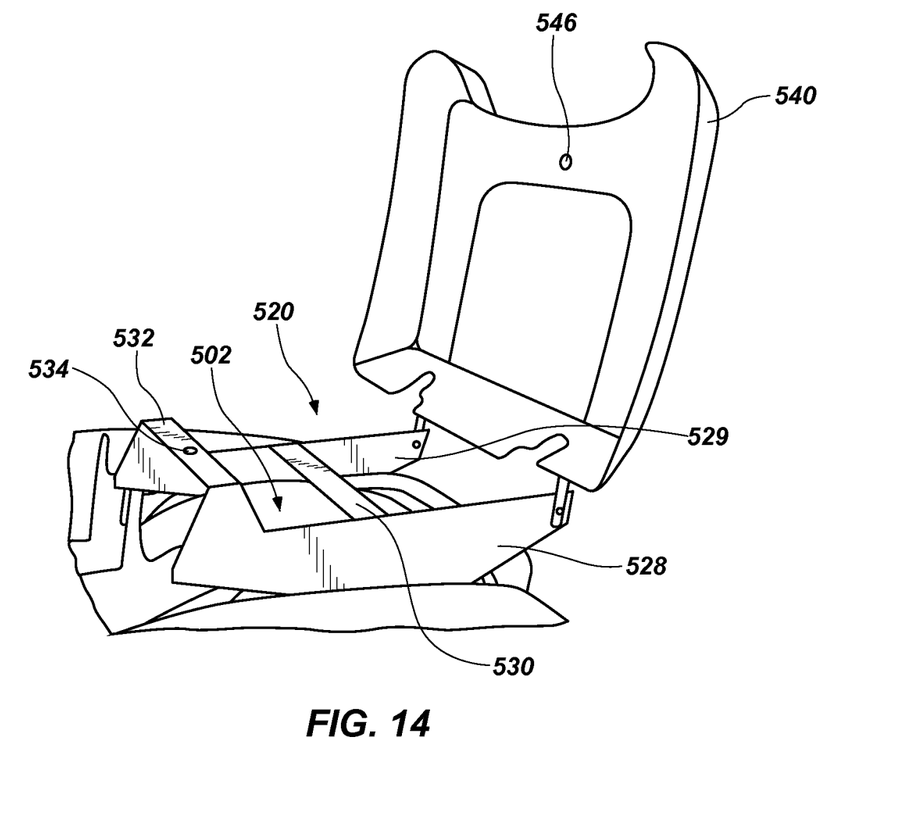
FIG. 14 illustrates a base without a movable carriage in accordance with an exemplary embodiment of the present invention.

Referring to FIG. 14, illustrated is a base without a movable carrier. In this embodiment, a base 520 may comprise side-mounts 528, 529 that may attach the base 520 to the motorcycle. The shell 540 may be coupled to the base 520. The base may also comprise a strut 530 to span the gap between the side mounts 528, 529, over the top of the rear fender 502. The base 520 may also provide a top platform surface 532 that may be configured to provide support, at least in part, for the shell 540 of the storage apparatus. The top platform 532 may include a locking feature 534 that may engage with a lock 546 on the shell 540 to prevent the shell 540 from moving away from the stowing position.

The foregoing detailed description describes the invention with reference to specific exemplary embodiments. However, it will be appreciated that various modifications and changes may be made without departing from the scope of the present invention as set forth in the appended claims. The detailed description and accompanying drawings are to be regarded as merely illustrative, rather than as restrictive, and all such modifications or changes, if any, are intended to fall within the scope of the present invention as described and set forth herein.

More specifically, while illustrative exemplary embodiments of the invention have been described herein, the present invention is not limited to these embodiments, but includes any and all embodiments having modifications, omissions, combinations (e.g., of aspects across various embodiments), adaptations and/or alterations as would be appreciated by those in the art based on the foregoing detailed description.

The limitations in the claims are to be interpreted broadly based on the language employed in the claims and not limited to examples described in the foregoing detailed description or during the prosecution of the application, which examples are to be construed as non-exclusive. For example, in the present disclosure, the term "preferably" is non-exclusive where it is intended to mean "preferably, but not limited to." Any steps recited in any method or process claims may be executed in any order and are not limited to the order presented in the claims. Means-plus-function or step-plus-function limitations will only be employed where for a specific claim limitation all of the following conditions are present in that limitation: a) "means for" or "step for" is expressly recited; and b) a corresponding function is expressly recited. The structure, material or acts that support the means-plus function are expressly recited in the description herein. Accordingly, the scope of the invention should be determined solely by the appended claims and their legal equivalents, rather than by the descriptions and examples given above.

What is claimed and desired to be secured by Letters Patent is:

1. A storage system for a motorcycle, comprising:
    a side-mount storage apparatus secured to said motorcycle; and
    a low-profile storage apparatus secured to said motorcycle operable with said side-mount storage apparatus, and comprising:
        a base attachable about a fender of said motorcycle;
        a shell supported about said base, and movable between a stowing position and an open position; and
        at least one storage compartment supported by an underside of said shell,
    wherein said shell of said low-profile storage apparatus extends at least partially across said side-mount storage apparatus, such that access to an opening of said side-mount storage apparatus is prevented when said shell is positioned in said stowing position, and
    wherein said shell is movable away from said side-mount storage apparatus to permit access to said opening of said side-mount storage apparatus.

2. The storage system of claim 1, wherein said shell comprises a lid to said opening of said side-mount storage apparatus.

3. The low-profile storage apparatus of claim 1, wherein said shell further comprises a cargo support on a top side of said shell configured to receive and secure cargo to the top side of said shell.

4. The low-profile storage apparatus of claim 3, further comprising at least one storage compartment supported by an underside of said shell, said storage compartment having an opening accessible upon said shell being positioned in said open position.

5. The storage apparatus of claim 1, further comprising a rotatable coupling between said base and said shell to enable movement of said shell between said stowing position and said open position.

6. The storage apparatus of claim 1, wherein said base comprises an open bottom end that exposes said at least one storage compartment from said bottom end when said shell is in said stowing position.

7. The storage apparatus of claim 1, wherein said base comprises a closed bottom end that provides an enclosure for said at least one storage compartment when said shell is in said stowing position.

8. The storage apparatus of claim 7, wherein said closed bottom end comprises a bottom barrier.

9. The storage apparatus of claim 1, wherein said shell is removably attached to said base.

10. The storage apparatus of claim 1, wherein said shell is lockable to said base preventing said shell from moving toward said open position.

11. The storage apparatus of claim 1, wherein said at least one storage compartment is defined, at least in part, by said shell and a vertical partition.

12. The storage apparatus of claim 1, wherein said at least one storage compartment is defined, at least in part, by said shell and a horizontal partition.

13. The storage apparatus of claim 1, wherein at least a portion of said at least one storage compartment is attached to said base, causing said opening of said at least one storage compartment to enlarge when said shell is moved toward said open position.

14. The storage apparatus of claim 1, wherein said at least one storage compartment comprises a plurality of storage compartments.

15. The storage apparatus of claim 1, wherein said at least one storage compartment comprises a container having an opening formed therein.

16. The storage apparatus of claim 15, wherein said container is removably secured to said shell.

\* \* \* \* \*